US005725643A

United States Patent [19]

Higashiyama

[11] Patent Number: 5,725,643
[45] Date of Patent: Mar. 10, 1998

[54] RECORDING INK

[75] Inventor: Shunichi Higashiyama, Yokkaichi, Japan

[73] Assignee: Brother Kogyo Kabushiki Kaisha, Nagoya, Japan

[21] Appl. No.: 854,528

[22] Filed: May 12, 1997

Related U.S. Application Data

[63] Continuation of Ser. No. 527,085, Sep. 12, 1995, abandoned.

[30] Foreign Application Priority Data

Sep. 20, 1994 [JP] Japan .................................. 6-224928

[51] Int. Cl.$^6$ .......................... C09D 11/02; C09D 11/14
[52] U.S. Cl. ........................... 106/31.27; 106/31.37; 106/31.58; 106/31.6; 106/31.69; 106/31.86
[58] Field of Search ........................ 106/31.27, 31.37, 106/31.58, 31.6, 31.69, 31.86

[56] References Cited

U.S. PATENT DOCUMENTS

| 3,946,398 | 3/1976 | Kyser et al. ........................ 346/1.1 |
| 4,597,794 | 7/1986 | Ohta et al. ........................ 106/20 R |
| 4,723,129 | 2/1988 | Endo et al. ........................ 346/1.1 |
| 5,016,028 | 5/1991 | Temple ........................ 346/140 R |
| 5,085,698 | 2/1992 | Ma et al. ........................ 106/20 D |
| 5,160,370 | 11/1992 | Suga et al. ........................ 106/20 R |
| 5,229,786 | 7/1993 | Suga et al. ........................ 346/1.1 |
| 5,271,765 | 12/1993 | Ma ........................ 106/20 D |
| 5,273,573 | 12/1993 | Kappele ........................ 106/22 R |

FOREIGN PATENT DOCUMENTS

| 0211278 | 2/1987 | European Pat. Off. . |
| A-53-12138 | 4/1978 | Japan . |
| 57-10660 | 1/1982 | Japan . |
| 57-10661 | 1/1982 | Japan . |
| 61-59914 | 12/1986 | Japan . |
| 63-51485 | 3/1988 | Japan . |
| 63-56575 | 3/1988 | Japan . |
| 1-15542 | 3/1989 | Japan . |
| 1-198671 | 8/1989 | Japan . |
| A-2-150355 | 6/1990 | Japan . |
| 2-255875 | 10/1990 | Japan . |
| 2-276876 | 11/1990 | Japan . |
| 2070049 | 9/1981 | United Kingdom . |
| 2071130 | 9/1981 | United Kingdom . |

*Primary Examiner*—Helene Klemanski
*Attorney, Agent, or Firm*—Oliff & Berridge, P.L.C.

[57] ABSTRACT

A recording ink includes water, a coloring agent and a water soluble co-solvent having a molecular weight of lower than 1,000. The recording ink has a viscosity at 25° C. of higher than 5 cps.

18 Claims, No Drawings

RECORDING INK

This is a Continuation of application Ser. No. 08/527,085 filed Sep. 12, 1995 now abandoned.

BACKGROUND OF THE INVENTION

1. Field of the Invention

The present invention relates to a recording ink containing at least water and a coloring agent.

2. Description of the Related Art

As the ink used for an ink jet recording method, inks comprising various kinds of dyes dissolved in water or a solvent composed of water and a water-soluble solvent, and various kinds of additives added thereto as required (such inks are hereinafter referred to as dye inks) have been used predominantly, as disclosed, for example, in JP-A-63-51485, JP-A-63-56575, and JP-A-1-198671. However, when the dye ink is used for printing, it results in problems such as insufficient water-fastness and light-fastness of recorded images on a recording medium.

In view of the above, application of an ink using a pigment such as carbon black or Diazo Yellow as a coloring agent in place of the dye has been proposed to improve the problems of the dye inks with respect to water-fastness and light-fastness of recorded images. For example, see JP-A-57-10660, JP-A-57-10661, U.S. Pat. No. 4,597,794 (JP-A-1-15542), U.S. Pat. No. 5,160,370, U.S. Pat. No. 5,229,786 (JP-A-2-255875) and JP-A-2-276876. Since the pigment ink adheres to a recording medium such as paper by using a resin or the like, the pigment ink is superior in water-fastness to the dye ink. Further, since the pigment is less reactive to light compared with the dye, the pigment ink is superior in light-fastness to the dye ink.

In an ink jet recording system, recording is conducted by filling an ink in an extremely narrow channel and ejecting ink droplets through a nozzle at the top end of the channel by instantaneously applying a physical force to the channel and depositing the droplets on a recording medium such as paper. Accordingly, a low viscosity ink is required for easy flow of the ink through the narrow channel. In the case of an aqueous ink, water is evaporated in the nozzle, which can cause a coloring agent to remain in and sometimes clog the nozzle, and thereby make recording impossible. A water soluble solvent of low volatility is usually added in an effort to prevent clogging in the nozzle, and an ink having a viscosity of 1 to 3 centipoises (cps) at 25° C. has been used.

When ink jet recording is conducted by using an ink having low viscosity of 1 to 3 cps at 25° C., the energy required for jetting can be reduced because of the low viscosity. However, this in turn results in a problem that splash tends to occur upon jetting of the ink through the nozzle to bring about a deterioration in the print quality. Splash means a phenomenon where a plurality of ink droplets are jetted in various directions from the nozzle.

SUMMARY OF THE INVENTION

The present invention has been proposed for overcoming the foregoing problems, and it is an object of the invention to provide a recording ink for improving print quality.

The foregoing object can be attained in accordance with the present invention with a recording ink comprising at least water and a coloring agent, and a water-soluble co-solvent having a molecular weight of less than 1,000, preferably less than 800, and a viscosity at 25° C. of more than 5 cps and, for example, less than 100 cps, preferably less than 20 cps.

In the recording ink according to the present invention having the foregoing constitution, since the ink contains a water-soluble co-solvent material having a molecular weight of less than 1,000 and a viscosity at 25° C. of more than 5 cps and less than, for example, 100 cps, preferably less than 20 cps, the energy required for jetting the ink can be reduced and the splashing phenomenon can be prevented so as to improve the print quality.

DETAILED DESCRIPTION OF PREFERRED EMBODIMENTS

In the present invention, water is preferably used as the solvent because it has low viscosity and excellent safety, it is easily handleable, available at low cost and free from odors. Water is contained in the ink in an amount of from, for example, 35 to 80% by weight, preferably 45 to 70% by weight, based on the entire ink.

As the coloring agent, dye or pigment is used with no particular restriction. The coloring agent is contained in the ink within a range of from, for example, 1 to 20% by weight, preferably 2 to 10% by weight, based on the entire ink. When dye alone is used as the coloring agent, the amount of dye may be, for example, 1 to 5% by weight of the ink. When pigment alone is used as the coloring agent, the amount of pigment may be, for example, 3 to 10% by weight.

As the dye, there can be mentioned, for example and without limitation, C.I. Direct Black 19, 154, 168, C.I. Direct Red 2, 4, 9, 23, 26, 31, 62, 72, 84, 95, 225, 233, 242, 247, C.I. Direct Violet 7, 9, 47, 51, 90, 243, C.I. Direct Yellow 8, 9, 27, 33, 39, 53, 86, 96, 100, 110, 161, 163, C.I. Direct Blue 1, 15, 25, 55, 68, 76, 80, 84, 87, 90, 106, 109, 158, 168, 194, 202, 211, 218, 236, 248, 252, 270, 289, 291, C.I. Food Black 2, C.I. Acid Black 7, 24, 29, 48, C.I. Acid Red 35, 42, 57, 82, 114, 127, 143, 158, 261, 301, 336, 361, C.I. Acid Yellow 19, 39, 44, 76, 135, 169, 196, 218, 227, C.I. Acid Blue 25, 41, 72, 78, 106, 120, 138, 181, 220, 232, 280, 326.

As the pigment, for black- and white-image recording there can be used, for example, carbon blacks such as furnace black, lamp black, acetylene black and channel black, metal oxides such as titanium oxide and zinc oxide or organic pigments such as orthonitroaniline black. Further, for color image recording, there can be used, for example, Toluidine Red, Permanent Carmine FB, Fast Yellow AAA, Disazo Orange PMP, Lake Red C, Brilliant Carmine 6B, Phthalocyanine Blue, quinacridone red, Dioxane Violet, Victoria Pure Blue, Alkali Blue Toner, Fast Yellow 10G, Disazo Yellow AAOT, Disazo Yellow AAMX, Disazo Yellow HR, Disazo Yellow AAOA, yellow iron oxide, orthonitroaniline orange, Dinitroaniline Orange, Vulcan Orange, Toluidine Red, chlorinated Para Red, Brilliant First Scarlet, Naphthol Red 23, Pyrazolone Red, barium red 2B, calcium red 2B, strontium red 2B, manganese red 2B, Barium Lithom Red, Pigment Scarlet 3B Lake, Lake Bordeaux 10B, Anthocyne 3B Lake, Anthocyne 5B Lake, Rhodamine 6G Lake, eosine lake, red iron oxide, Faphtol Red FGR, Rhodamine B Lake, Methyl Violet Lake, dioxazine violet, Basic Blue 5B Lake, Basic Blue 6G Lake, Fast Sky Blue, Alkali Blue R Toner, Peacock Blue Lake, prussian blue, ultramarine, Reflex Blue 2G, Reflex Blue R, Brilliant Green Lake, Diamond Green Thio-flavine Lake, Phthalocyanine Green G, Green Gold, Phthalocyanine Green Y, iron oxide powder, rust powder, zinc flower, titanium oxide, calcium carbonate, clay, barium sulfate, alumina, alumina white, aluminum, bronze, daylight fluorescent pigment, pearl pigment, Naphthol Carmine FB, Naphthol Red M, Fast Yellow G, Disazo Yellow AAA, Alkali Blue G Toner, as well as processed pigments such as, for example, graft carbon, in which the surface of the pigments is coated with a resin or the like.

In the case of using pigment for the coloring agent, a dispersant is usually required for dispersing the pigment in water and there can be used, for example, water-soluble high molecular weight compounds such as, for example, polyvinyl alcohol, polyvinyl pyrrolidone, methyl cellulose, hydroxypropyl cellulose and polyacrylate, nonionic surface active agents such as polyoxyethylenes, polyoxyethylene alkyl ethers, polyoxyethylene alkyl aryl ethers, polyoxyethylene fatty acid esters, polyoxyethylene alkyl amines, alkylalkanol amides, sorbitan fatty acid esters, polyoxyethylene sorbitan fatty acid esters, polyoxyethylene sorbitol fatty acid esters, glycerin fatty acid esters, and anionic surface active agents such as fatty acid salts, higher alcohol sulfate ester salts, sulfates of aliphatic amines and amides, aliphatic alcohol phosphate esters, sulfonates of dibasic fatty acid esters, aliphatic amide sulfonates, alkylaryl sulfonates and naphthalene sulfonic acid—formalin condensates.

As the water soluble co-solvent material having a molecular weight of less than 1,000, preferably less than 800, a material having an effect of increasing the viscosity is effective and, for example, glycols such as ethylene glycol, diethylene glycol, triethylene glycol, propylene glycol or glycerin can also provide an effect of preventing the ink from clogging in the nozzle. Polyethylene glycol, polypropylene glycol, ethylene glycol—propylene glycol copolymer or the like may also be used, as may, for example, polyvinyl alcohol, polyvinyl pyrrolidone or methylcellulose. The water soluble co-solvent is contained in the ink from, for example, 20 to 65% by weight, preferably 25 to 55% by weight, based on the entire ink.

In the recording ink according to the present invention, a solvent of high boiling point can optionally be added to improve the capability of the ink in preventing the nozzle from clogging. Such high boiling solvent can include, for example, glycols such as ethylene glycol, diethylene glycol, triethylene glycol, propylene glycol and glycerin, and nitrogen-containing organic solvents such as N-methyl-2-pyrrolidone and 1,3-dimethylimidazolidine.

Some water soluble co-solvents having a molecular weight less than 1,000 may also function as the high boiling point solvent to prevent the nozzle from clogging. For example, if the water soluble co-solvent with a molecular weight of less than 1,000 is a glycol, it can function to both increase the viscosity of the ink and prevent clogging of the ink jet nozzle so that an additional high boiling point solvent may not be necessary. Where the water soluble co-solvent having a molecular weight less than 1,000 is a material that does not also have an effect of preventing clogging of the ink jet nozzle, for example a polyvinyl alcohol, polyvinyl pyrrolidone or methylcellulose, a high boiling point solvent is preferably added.

In addition, surface tension controllers, pH controllers, anti-mold agents or penetrating agents may be optionally used in the recording ink. For instance, the surface tension controller, if present, may be present from, for example, 0.01 to 15% by weight, preferably 0.1 to 10% by weight, based on the entire ink. The pH controller, if present, may be present from, for example, 0.01 to 15% by weight, preferably 0.1 to 10% by weight, based on the entire ink, and the anti-mold agent, if present, may be present from, for example, 0.001 to 1% by weight, preferably 0.01 to 0.1% by weight, based on the entire ink. The penetrating agent, if present, may be present from, for example, 0.01 to 15% by weight, preferably 0.1 to 10% by weight, based on the entire ink.

The recording ink should have a viscosity at 25° C. of greater than 5 cps, preferably from 5 to 100 cps, more preferably from 8 to 20 cps.

Examples of the present invention and comparative examples are shown below.

EXAMPLES 1

| | |
|---|---|
| Water | 48 wt % |
| Dye (C.I. Direct Black 154) | 2 wt % |
| Glycerin (molecular weight: 92) | 49 wt % |
| Penetrating agent (polyoxyethylene derivative: Emulgen A-90, manufactured by Kao Corp.) | 1 wt % |

The materials are stirred and mixed to obtain a recording ink having a viscosity of 5.7 cps (25° C.).

Comparative Example 1

| | |
|---|---|
| Water | 88 wt % |
| Dye (C.I. Direct Black 154) | 2 wt % |
| Glycerin (molecular weight: 92) | 9 wt % |
| Penetrating agent (polyoxyethylene derivative: Emulgen A-90, manufactured by Kao Corp.) | 1 wt % |

The materials are stirred and mixed to obtain a recording ink having a viscosity of 1.4 cps (25° C.).

EXAMPLE 2

| | |
|---|---|
| Water | 48 wt % |
| Dye (C.I. Direct Black 154) | 2 wt % |
| Diethylene glycol (molecular weight: 106) | 50 wt % |

The materials are stirred and mixed to obtain a recording ink having a viscosity of 5.3 cps (25° C.).

Comparative Example 2

| | |
|---|---|
| Water | 88 wt % |
| Dye (C.I. Direct Black 154) | 2 wt % |
| Diethylene glycol (molecular weight: 106) | 10 wt % |

The materials are stirred and mixed to obtain a recording ink having a viscosity of 1.4 cps (25° C.).

EXAMPLE 3

| Water | 53 wt % |
|---|---|
| Dye (C.I. Direct Black 154) | 2 wt % |
| Glycerin (molecular weight: 92) | 9 wt % |
| Polyethylene glycol (average molecular weight: 200) | 35 wt % |
| Penetrating agent (polyoxyethylene derivative: Emulgen A-90, manufactured by Kao Corp.) | 1 wt% |

The materials are stirred and mixed to obtain a recording ink having a viscosity of 6.8 cps (25° C.).

EXAMPLE 4

| Water | 58 wt % |
|---|---|
| Dye (C.I. Direct Black 154) | 2 wt % |
| Glycerin (molecular weight: 92) | 9 wt % |
| Polyethylene glycol (average molecular weight: 400) | 30 wt % |
| Penetrating agent (polyoxyethylene) derivative: Emulgen A-90, manufactured by Kao Corp.) | 1 wt % |

The materials are stirred and mixed to obtain a recording ink having a viscosity of 5.5 cps (25° C.).

EXAMPLE 5

| Water | 63 wt % |
|---|---|
| Dye (C.I. Direct Black 154) | 2 wt % |
| Glycerin (molecular weight: 92) | 9 wt % |
| Polyethylene glycol (average molecular weight: 600) | 25 wt % |
| Penetrating agent (polyoxyethylene derivative: Emulgen A-90, manufactured by Kao Corp.) | 1 wt % |

The materials are stirred and mixed to obtain a recording ink having a viscosity of 5.3 cps (25° C.).

EXAMPLE 6

| Water | 68 wt % |
|---|---|
| Dye (C.I. Direct Black 154) | 2 wt % |
| Glycerin (molecular weight: 92) | 9 wt % |
| Polyethylene glycol (average molecular weight: 1000) | 20 wt % |
| Penetrating agent (polyoxyethylene derivative: Emulgen A-90, manufactured by Kao Corp.) | 1 wt % |

The materials are stirred and mixed to obtain a recording ink having a viscosity of 6.0 cps (25° C.).

Comparative Example 3

| Water | 73 wt % |
|---|---|
| Dye (C.I. Direct Black 15) | 2 wt % |
| Glycerin (molecular weight: 92) | 9 wt % |
| Polyethylene glycol (average molecular weight: 1450) | 15 wt % |

-continued

| Penetrating agent (polyoxyethylene derivative: Emulgen A-90, manufactured by Kao Corp.) | 1 wt % |
|---|---|

The materials are stirred and mixed to obtain a recording ink having a viscosity of 6.4 cps (25° C.).

Comparative Example 4

| Water | 78 wt % |
|---|---|
| Dye (C.I. Direct Black 154) | 2 wt % |
| Glycerin (molecular weight: 92) | 9 wt % |
| Polyethylene glycol (average molecular weight: 2000) | 10 wt % |
| Penetrating agent (polyoxyethylene derivative: Emulgen A-90, manufactured by Kao Corp.) | 1 wt % |

The materials are stirred and mixed to obtain a recording ink having a viscosity of 6.8 cps (25° C.).

EXAMPLE 7

| Water | 49 wt % |
|---|---|
| Pigment (Carbon Black: Printex 150T manufactured by Degussa) | 5 wt % |
| Dispersant (Demol N, Sodium salt of naphthalene sulfonic acid-formalin condensation product, manufactured by Kao Corp.) | 3 wt % |
| Glycerin (molecular weight: 92) | 40 wt % |
| Permeation agent (ethanol) | 3 wt % |

The materials are stirred and mixed to obtain a recording ink having a viscosity of 5.8 cps (25° C).

Comparative Example 5

| Water | 81 wt % |
|---|---|
| Pigment (Carbon Black: Printex 150T manufactured by Degussa) | 5 wt % |
| Dispersant (Demol N, Sodium salt of naphthalene sulfonic acid-formalin condensation product, manufactured by Kao Corp.) | 3 wt % |
| Polyethylene glycol (average molecular weight: 2000) | 8 wt % |
| Permeation agent (ethanol) | 3 wt % |

The materials are stirred and mixed to obtain a recording ink having a viscosity of 5.6 cps (25° C.).

Printing tests are conducted for the recording inks in the examples and comparative examples using a shearing mode type ink jetting device disclosed in JP-A-2-150355. Evaluation is made for the minimum voltage required for jetting and the print quality and the results are shown in Table 1.

TABLE 1

|  | Minimum voltage required for jetting (V) | Print quality |
| --- | --- | --- |
| Example 1 | 25.4 | good |
| Comparative Example 1 | 25.2 | remarkable splash |
| Example 2 | 25.5 | good |
| Comparative Example 2 | 25.4 | remarkable splash |
| Example 3 | 26.3 | good |
| Example 4 | 25.3 | good |
| Example 5 | 25.2 | good |
| Example 6 | 25.8 | good |
| Comparative Example 3 | 29.5 | good |
| Comparative Example 4 | 30.7 | good |
| Example 7 | 26.4 | good |
| Comparative Example 5 | 31.2 | good |

For the recording inks in Examples 1–7, the minimum voltage required for jetting is about 26 V and the print quality is good. In the recording inks for Comparative Examples 1 and 2, the minimum voltage required for jetting is substantially the same as that in Examples 1–7, but the splash is remarkable and the print quality is poor. In the recording ink in Comparative Examples 3, 4 and 5, although the print quality is good, the minimum voltage required for jetting is about 30 V, an approximate increase in voltage of 15%, so that more electric power is consumed and the energy efficiency is poor compared with Examples 1–7.

As explained above, since the recording inks in Examples 1–7 contain the water soluble co-solvent having a molecular weight of less than 1,000 and the inks have a viscosity at 25° C. of higher than 5 cps and preferably lower than, for example, 100 cps, more preferably lower than 20 cps, they require less energy for the jetting of the ink and prevent splashing to provide good print quality. Further, the recording inks in Examples 1–7 cause less drying in the nozzles and can be jetted satisfactorily.

Further, since the recording ink in Example 7 uses a pigment, it is superior in water fastness and light fastness compared to the recording inks using dyes in Examples 1–6.

What is claimed is:

1. A recording ink comprising:

water;

at least one coloring agent; and a water soluble co-solvent selected from the group consisting of polyvinyl alcohol, polyvinyl pyrrolidone, methylcellulose and mixtures thereof having a molecular weight of lower than 1,000;

wherein the recording ink has a viscosity greater than 5 cps at 25° C.

2. The recording ink according to claim 1, wherein the coloring agent is a dye.

3. The recording ink according to claim 1, wherein the coloring agent is a pigment.

4. The recording ink according to claim 3, wherein the pigment is dispersed in water with a dispersant.

5. The recording ink according to claim 1, wherein the recording ink has a viscosity of from 5 to 100 cps at 25° C.

6. The recording ink according to claim 5, wherein the recording ink has a viscosity of from 8 to 20 cps at 25° C.

7. The recording ink according to claim 1, wherein water is contained in the recording ink in an amount of from 35 to 80% by weight of the recording ink.

8. The recording ink according to claim 7, wherein water is contained in the recording ink in an amount of from 45 to 70% by weight of the recording ink.

9. The recording ink according to claim 1, wherein the coloring agent is contained in the recording ink in an amount of from 1 to 20% by weight of the recording ink.

10. The recording ink according to claim 9, wherein the coloring agent is contained in the recording ink in an amount of from 2 to 10% by weight of the recording ink.

11. The recording ink according to claim 1, wherein the water soluble co-solvent is contained in the recording ink in an amount of from 20 to 65% by weight of the recording ink.

12. The recording ink according to claim 11, wherein the water soluble co-solvent is contained in the recording ink in an amount of from 25 to 55% by weight of the recording ink.

13. The recording ink according to claim 1, wherein the ink further comprises a high boiling point solvent.

14. The recording ink according to claim 1, wherein the recording ink further comprises at least one member selected from the group consisting of surface tension controllers, pH controllers, anti-mold agents and penetrating agents.

15. A method of producing a printed image of high print quality comprising jetting a recording ink through an ink jet nozzle onto a recording medium, wherein said recording ink comprises water, at least one coloring agent, and a water soluble co-solvent selected from the group consisting of polyvinyl alcohol, polyvinyl pyrrolidone, methylcellulose and mixtures thereof having a molecular weight of lower than 1,000, wherein the recording ink has a viscosity higher than 5 cps at 25° C.

16. A recording ink comprising:

water;

at least one coloring agent comprising one or more pigments dispersed in water with a dispersant; and a water soluble co-solvent selected from the group consisting of glycols, polyglycols, glycerin, polyvinyl alcohol, polyvinyl pyrrolidone, methylcellulose and mixtures thereof having a molecular weight of lower than 1,000;

wherein the recording ink has a viscosity greater than 5 cps at 25° C.

17. The recording ink according to claim 16, wherein said glycols are selected from the group consisting of ethylene glycol, diethylene glycol, triethylene glycol, propylene glycol and mixtures thereof.

18. The recording ink according to claim 16, wherein said polyglycols are selected from the group consisting of polyethylene glycol, polypropylene glycol, ethylene glycol-propylene glycol copolymer and mixtures thereof.

* * * * *